(12) United States Patent  
Amtmann et al.

(10) Patent No.: US 8,848,839 B2  
(45) Date of Patent: *Sep. 30, 2014

(54) DATA CARRIER PROVIDED WITH AT LEAST TWO DECODING STAGES

(75) Inventors: Franz Amtmann, Graz (AT); Dominik Josef Berger, Graz (AT); Wolfgang Eber, Graz (AT); Stefan Posch, Graz (AT); Robert Rechberger, Gratwein (AT)

(73) Assignee: NXP B.V., Eindhoven (NL)

( * ) Notice: Subject to any disclaimer, the term of this patent is extended or adjusted under 35 U.S.C. 154(b) by 1101 days.

This patent is subject to a terminal disclaimer.

(21) Appl. No.: 12/496,584

(22) Filed: Jul. 1, 2009

(65) Prior Publication Data

US 2009/0262866 A1    Oct. 22, 2009

Related U.S. Application Data

(63) Continuation of application No. 09/487,151, filed on Jan. 19, 2000, now Pat. No. 7,570,716.

(30) Foreign Application Priority Data

Jan. 26, 1999    (EP) ..................................... 99890016

(51) Int. Cl.
    *H04L 27/06*    (2006.01)
(52) U.S. Cl.
    USPC ................. 375/340; 341/68; 341/69; 341/70
(58) Field of Classification Search
    USPC ................... 714/746, 794–795; 375/340–341
    See application file for complete search history.

(56) References Cited

U.S. PATENT DOCUMENTS 4,617,553 A * 10/1986 Webster et al. ................. 341/58
5,230,003 A *  7/1993 Dent et al. ..................... 714/794

(Continued)

FOREIGN PATENT DOCUMENTS

EP         0669591 A2    2/1995
EP         0 730 251 A2  9/1996

(Continued)

OTHER PUBLICATIONS

Finkenzeller, Klaus,"RFID Handbook, Fundamentals and Applications in Contactless Smart Cards and Indentification"; Second Edition; May 2003.

(Continued)

*Primary Examiner* — Curtis Odom

(57) ABSTRACT

In a data carrier (1) which includes receiving means (5) for receiving a modulated carrier signal (MTS) which contains a data signal (DS1) encoded in conformity with an encoding method (MA, PW, MI, RTZ, FSK, PSK), demodulation means (9) for demodulating the received modulated carrier signal (MTS) and for outputting the encoded data signal (DS1) contained therein, decoding means (10, 20) for decoding the encoded data signal (DS1) and for outputting data (D1, D2), and data processing means (11) for processing the data (D1, D2) output by the decoding means (10, 20), the decoding means (10, 20) are provided with at least a first decoding stage (12) and a second decoding stage (13), the first decoding stage (12) being arranged to decode a data signal (DS1) encoded in conformity with a first method (RTZ) whereas the second decoding stage (13) is arranged to decode a data signal (DS1) encoded in conformity with a second method (MI).

11 Claims, 4 Drawing Sheets

(56) References Cited

U.S. PATENT DOCUMENTS

| | | | |
|---|---|---|---|
| 5,345,231 | A | 9/1994 | Koo et al. |
| 5,420,412 | A | 5/1995 | Kowalski |
| 5,434,886 | A | 7/1995 | Kazawa et al. |
| 5,701,294 | A | 12/1997 | Ward et al. |
| 5,940,438 | A | 8/1999 | Poon et al. |
| 5,940,447 | A | 8/1999 | Connell et al. |
| 5,982,819 | A | 11/1999 | Womack et al. |
| 6,037,835 | A | 3/2000 | Berger et al. |
| 6,044,485 | A | 3/2000 | Dent et al. |
| 6,045,043 | A | 4/2000 | Bashan et al. |
| 6,098,890 | A | 8/2000 | Kreft et al. |
| 6,192,070 | B1 | 2/2001 | Poon et al. |
| 6,240,538 | B1 * | 5/2001 | Dent et al. .............. 714/762 |
| 6,498,923 | B2 | 12/2002 | Ikefuji et al. |
| 6,735,735 | B1 | 5/2004 | Ohira et al. |
| 7,570,716 | B1 * | 8/2009 | Amtmann et al. ........ 375/324 |

FOREIGN PATENT DOCUMENTS

| | | |
|---|---|---|
| FR | 2751148 A1 | 1/1998 |
| JP | 04-291826 A | 10/1992 |
| JP | 09-259233 A | 10/1997 |
| JP | 11-191745 A | 7/1999 |
| WO | 96/11455 | 4/1996 |
| WO | 96/29673 | 9/1996 |
| WO | 98/44649 | 10/1998 |
| WO | 0045328 A1 | 8/2000 |

OTHER PUBLICATIONS

Perl Monks; "Difference between encoding and encryption?"; http://perlmonks.thepen.com/66249.html; pp. 1-6; Mar. 22, 2001.

"Indentification cards—Contactless integrated circuit(s) cards-Proximity Cards"; ISO/IEC FDIS 14443-2:2000( E ); 2000.

International Search Report for Patent Appl. No. PCT/EP2000/000226 (May 8, 2000).

* cited by examiner

DATA CARRIER PROVIDED WITH AT LEAST TWO DECODING STAGES

CROSS-REFERENCE TO RELATED APPLICATIONS

This application is a continuation of copending U.S. patent application Ser. No. 09/487,151, filed on Jan. 19, 2000, which is the national stage of international patent application no. PCT/EP2000/000226, filed on Jan. 13, 2000, which claims priority under 35 U.S.C. §119 to European patent application no. 99890016.1, filed on Jan. 26, 1999, the contents of which are incorporated by reference herein The invention relates to a data carrier which includes receiving means for receiving a modulated carrier signal which contains a data signal encoded in conformity with an encoding method, demodulation means for demodulating the received modulated carrier signal and for outputting the encoded data signal contained therein, decoding means for decoding the encoded data signal and for outputting data, and data processing means for processing the data output by the decoding means.

A data carrier of the kind set forth in the first paragraph is known from the document EP 0 669 591 A2 and is formed by a so-called transponder.

Data to be transmitted to the data carrier can be encoded in conformity with a pulse width encoding method by a transmitter station so as to form an encoded data signal and a carrier signal can be modulated with the encoded data signal by amplitude modulation. According to the pulse width encoding method, a data bit "0" of the data to be transmitted is encoded with a smaller number of carrier signal oscillations and a data bit "1" of the data to be transmitted is encoded with a larger number of carrier signal oscillations. The carrier signal oscillations of each data bit are separated from one another by a respective blanking interval in the encoded data signal.

The known data carrier includes receiving means which are formed by an antenna coil. A modulated carrier signal output by the transmitter station can be received by the receiving means.

The data carrier also includes demodulation means for demodulating the received, modulated carrier signal by amplitude demodulation and for outputting the encoded data signal contained in the modulated carrier signal.

By counting the carrier signal oscillations present between two blanking intervals in the encoded data signal, the decoding means of the known data carrier determine whether a data bit "0" or a data bit "1" is present in the encoded data signal; the decoding means thus decode the encoded signal. Data bits determined by the decoding means are output as received data to processing means of the data carrier for the further processing of the received data. The processing means are formed by a control unit, a digital comparator and a memory.

The known data carrier has been found to have the drawback that the data carrier is capable of decoding exclusively received encoded data signals which have been encoded in conformity with the pulse width encoding method. Consequently, data contained in received encoded data signals and encoded in conformity with a different encoding method in a transmitter station cannot be decoded by the decoding means of the known data carrier; therefore, such data cannot be processed by the data carrier.

Furthermore, a special drawback is encountered in that the decoding means of the known data carrier are constructed in such a manner that they decode every received encoded data signal in conformity with the pulse width coding method and hence output false data when a received encoded data signal has been encoded according to an encoding method other than the pulse width encoding method. Such false data could induce very faulty operation of the known data carrier; for example, the doors to a security zone could then be opened to a person who is not authorized to enter such a zone.

It is an object of the invention to eliminate the described problems and to provide an improved data carrier of the kind set forth in the first paragraph. In a data carrier of the kind set forth in the first paragraph this object is achieved according to the invention in that the decoding means include at least a first decoding stage and a second decoding stage, the first decoding stage being arranged to decode a data signal encoded in conformity with a first encoding method whereas the second decoding stage is arranged to decode a data signal encoded in conformity with a second encoding method.

This offers the advantage that the data carrier is arranged to decode data which is contained in a received encoded data signal and has been encoded in conformity with the first or the second encoding method. Known encoding methods are, for example, a Manchester encoding method, a pulse width encoding method, a Miller encoding method, a return-to-zero encoding method, a frequency shift keying or FSK encoding method, or a phase shift keying or PSK encoding method.

A special advantage is then achieved in that a data carrier is thus suitable for use in various fields of application, for example for access control systems or toll systems in which different encoding methods may be customary or even standardized. In this context, reference is made, for example to a known "Approximity Standard" (ISO 14 443); according to this standard a Miller encoding method is used for communication with a data carrier of the type A whereas in the case of communication with a data carrier of the type B a No-Return-To-Zero encoding method is used.

It has been found that the steps disclosed in Claim 2 are advantageously taken in a data carrier as disclosed in Claim 1. This offers the advantage that a decision stage of the data carrier decides which of the data output by the at least two decoding stages is to be used for further processing by means of the processing means. It is thus avoided that a data signal encoded by a transmitter station in conformity with a first encoding method is decoded in conformity with a second encoding method in one of the decoding stages of the data carrier and that false data output by this decoding stage are processed in the processing means.

It has been found that it is advantageous to take the steps described in Claim 3 in a data carrier device as disclosed in Claim 2. This offers the advantage that the decision stage can decide which of the data output by a decoding stage exhibits the lowest error rate, for example on the basis of error rate information of the data output by the decoding stages, which error rate information can be determined in the decoding stages, from redundancy information contained in the encoded data signal and constitutes decision supporting information. The decoding stage outputting the data having the lowest error rate then constitutes the decoding stage which is suitable for decoding the received encoded data signal.

It has been found that it is advantageous to take the steps disclosed in Claim 4 in a data carrier device as disclosed in Claim 2. This offers the advantage that a transmitter station can supply the data carrier with decoding stage instruction information which is contained in the modulated carrier signal and is capable of characterizing the decoding stage of the data carrier which is arranged to decode an encoded data signal transmitted by the transmitter station in the modulated carrier signal after the decoding stage instruction information. A transmitter station communicating with the data carrier can thus always specify the respective decoding stage suitable for the decoding of the encoded data signal contained in the modulated carrier signal transmitted by the transmitter station.

It has been found that it is advantageous to take the steps of Claim 5 in a data carrier device as disclosed in Claim 1. The advantage is thus achieved that data received by the data carrier before the reception of a decision as to which decoding stage is suitable for the decoding of a received encoded data signal will not be lost.

The steps disclosed in Claim 6 are advantageously taken in a data carrier device as disclosed in Claim 2. At the beginning of each communication operation with a transmitter station for which it is not yet known which encoding method is used therein so as to encode the data to be transmitted, the decision stage then applies the data of the first decoding stage to the processing means which decode a received encoded data signal in conformity with an encoding method preferably used by transmitter stations. In the case of data carriers without storage stage this offers the advantage that most of the data received in the data carrier before a decision as to which decoding stage is suitable for the decoding of a received encoded data signal will not be lost.

It has been found that the steps disclosed in Claim 7 are advantageously taken in a data carrier device as described in Claim 1. This offers the advantage that the data carrier is also arranged to transmit an encoded data signal which is contained in a modulated carrier signal and contains data which has been encoded in conformity with one of at least two different encoding methods.

The invention will be described in detail hereinafter on the basis of two embodiments which are shown in the drawings, however, without the invention being restricted thereto.

Figure 1:
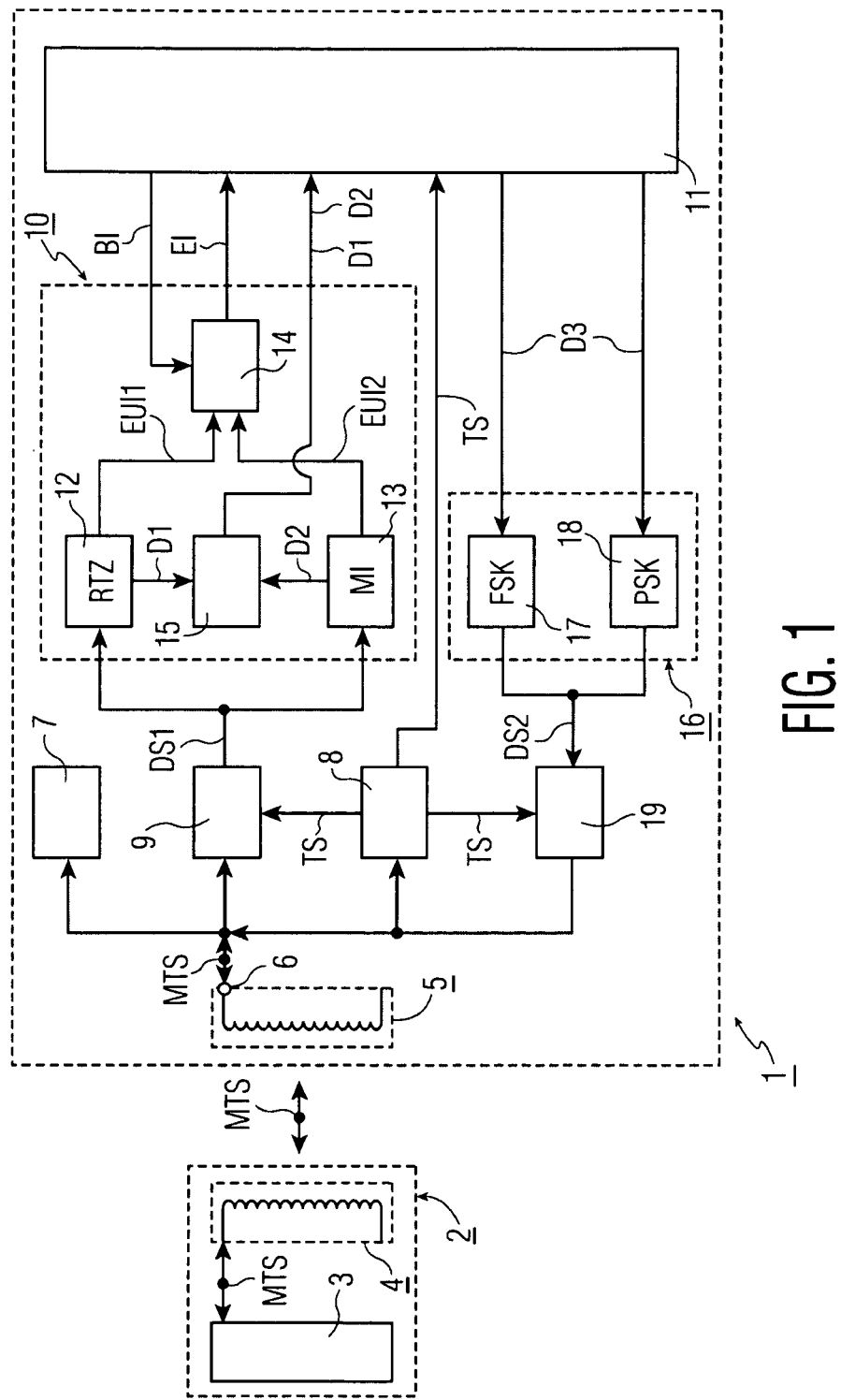
FIG. 1 shows a block diagram of a first embodiment of a smart card according to the invention which is arranged for the contactless exchange of data with a base station, the smart card including two decoding stages for the decoding of received data signals encoded in conformity with a Return-To-Zero encoding method or a Miller encoding method.
Figure 2:
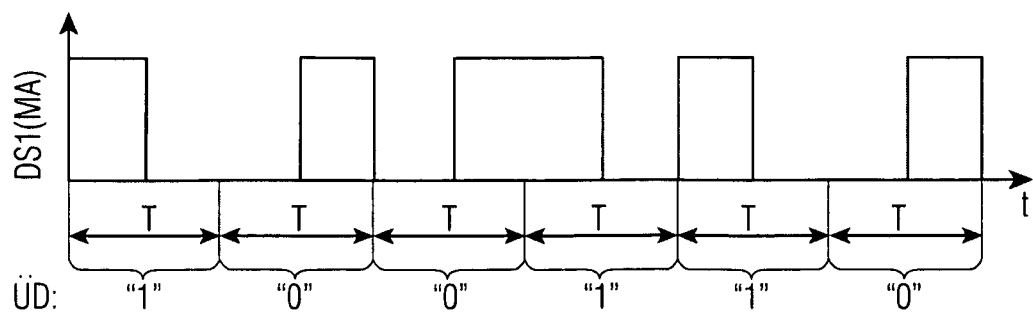
FIG. 2 shows a waveform of a data signal which has been encoded in conformity with a Manchester encoding method and may be contained in a modulated carrier signal received by the smart card.
Figure 3:
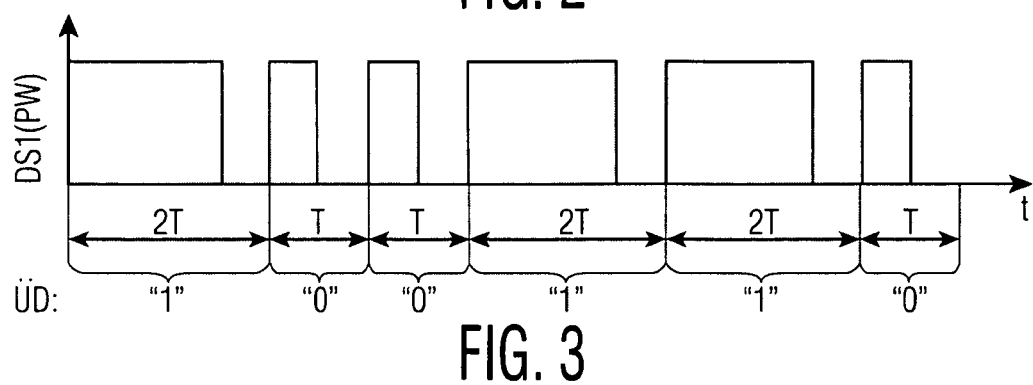
FIG. 3 shows a waveform of a data signal which has been encoded in conformity with a pulse width encoding method and may be contained in a modulated carrier signal received by the smart card.

FIG. 1 shows a block diagram of a smart card 1 which constitutes a first embodiment of a data carrier according to the invention and is arranged for the contactless exchange of data with a base station 2. The base station 2 constitutes a ticket machine which is to debit an amount of 9 Euros to the balance due to the user of the smart card 1 which is stored as balance data in the smart card 1. To this end, the base station 2 includes data processing means 3 in which debit data AD representing the amount of 9 euros is stored as a bit sequence "1001".

The data processing means 3 are also arranged to generate redundancy information RD on the basis of which the smart card 1 can recognize errors in the received debit data AD which have occurred during the transmission of the debit data AD from the base station 2 to the smart card 1. The data processing means 3 are arranged to generate the redundancy information RD by determining a sum of the bit sequence "1001" of the debit data AD. Redundancy data RD is then determined as redundancy information which has the value "2" for the bit sequence "1001" of the debit data AD and corresponds to the bit sequence "10".

Transmission data ÜD to be applied to the smart card 1 is formed by the data processing means 3 by chaining the bit sequences of the debit data AD and the redundancy data RD. The transmission data ÜD is formed by the bit sequence "100110" in the case of a bit sequence "1001" of the debit data AD and a data sequence "10" of the redundancy data RD. The described determination of transmission data ÜD is customarily performed in known smart cards; debit data AD may then be formed, for example by a bit sequence of 64 bits whereas redundancy data RD is formed by a bit sequence of 16 bits.

The FIGS. 2, 3, 4, 5, 6 and 7 show waveforms of encoded data signals DS1 in which the bit sequence "100110" of the transmission data ÜD has been encoded in conformity with six different known encoding methods. In order to obtain the waveform of the encoded data signal DS1(MA) shown in FIG. 2, a Manchester encoding method was applied; in order to obtain the signal waveform of the encoded data signal DS1(PW) shown in FIG. 3, a pulse width encoding method was applied; in order to obtain the signal waveform of the encoded data signal DS1(MI) shown in FIG. 4, a Miller encoding method was applied; in order to obtain the signal waveform of the encoded data signal DS1(RTZ) shown in FIG. 5, a Return-To-Zero encoding method was applied; in order to obtain the waveform of the encoded data signal DS1(FSK) shown in FIG. 6, a frequency shift keying (FSK) encoding method was applied, and in order to obtain the waveform of the encoded data signal DS1(PSK) shown in FIG. 7, a phase shift keying (PSK) encoding method was applied. A number of appropriate further encoding methods will be known to those skilled in the art.

Figure 5:
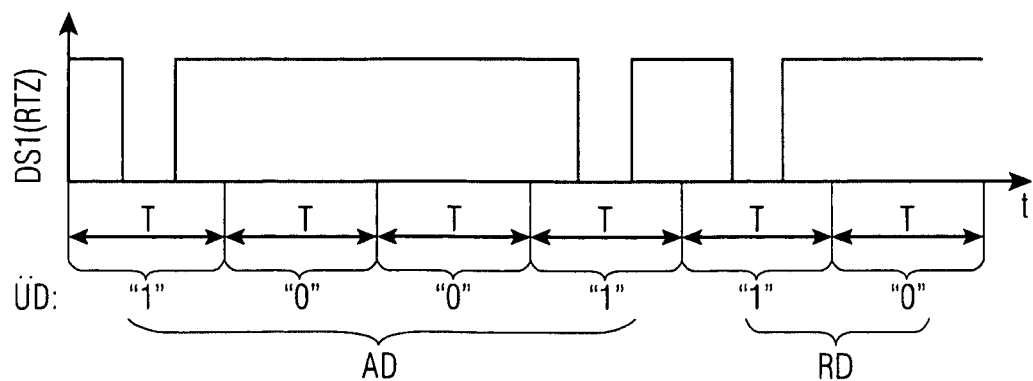
FIG. 5 shows a waveform of a data signal encoded in conformity with the Return-To-Zero encoding method and may be contained in a modulated carrier signal received by the smart card.
Figure 6:
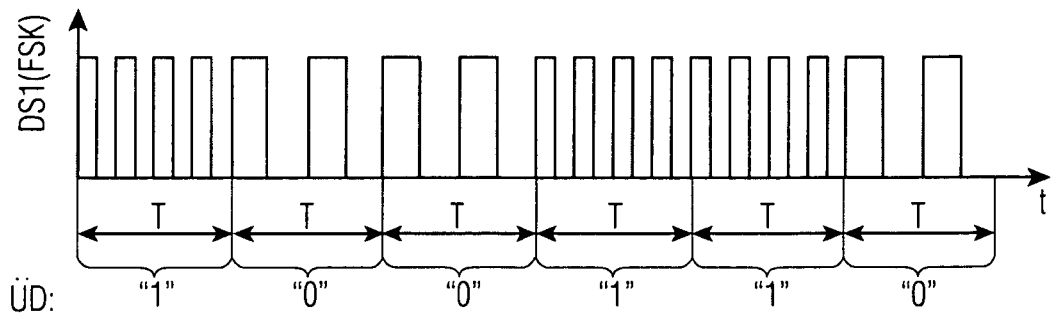
FIG. 6 shows a waveform of a data signal which has been encoded in conformity with a frequency keying encoding method and may be contained in a modulated carrier signal received by the smart card.

The data processing means 3 of the base station 2 also include encoding means for the encoding of bit sequences of transmission data ÜD, for example the bit sequence "100110", in conformity with the Return-To-Zero encoding method. The encoding means of the data processing means 3 are capable of delivering the waveform of the encoded data signal DS1(RTZ) with the bit sequence "100110" as shown in FIG. 5.

The data processing means 3 of the base station 2 also include modulation means for modulating an encoded data signal DS1(RTZ), output by the encoding means of the data processing means 3, by amplitude modulation. A carrier signal TS which has a carrier frequency of 13.56 MHz and a period duration T(TS) is then modulated with an encoded data signal DS1(RTZ) output by the encoding means, the modulation depth being fixed at 100%.

Figure 8:
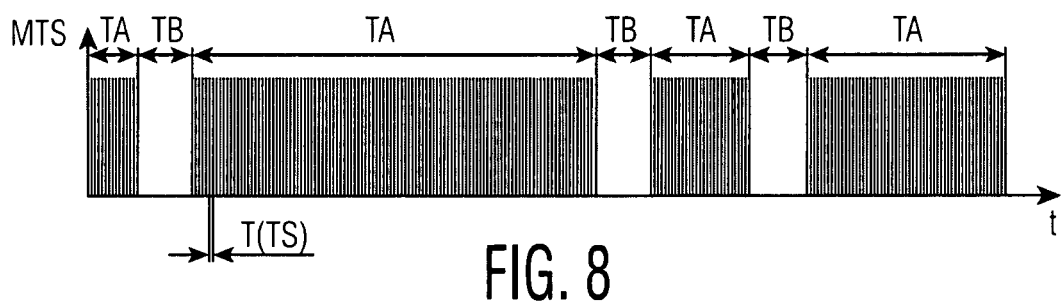
FIG. 8 shows a waveform of a modulated carrier signal which can be received by the smart card and contains a data signal encoded in conformity with the Return-To-Zero encoding method.

FIG. 8 shows a modulated carrier signal MTS which can be output by the modulation means and is formed, by the carrier signal TS during time intervals TA in which the encoded data signal DS1(RTZ) contained in the modulated carrier signal MTS has a high amplitude value. During further time intervals TB, in which the encoded data signal DS1(RTZ) contained in the modulated carrier signal MTS has a low amplitude value, no carrier oscillations of the carrier signal TS are contained in the modulated carrier signal MTS.

The base station 2 also includes transmission and receiving means 4 whereto a modulated carrier signal MTS produced by the data processing means 3 can be applied. The transmission and receiving means 4 are arranged to transmit a modulated carrier signal MTS, applied thereto by the data processing means 3, in an electromagnetic alternating field. The transmission and receiving means 4 are also arranged to receive a modulated carrier signal MTS which is contained in an electromagnetic alternating field and to output a received modulated carrier signal MTS to the data processing means 4 for the further processing of data contained in the modulated carrier signal MTS.

The smart card 1 includes transmission and receiving means 5 which are arranged to transmit a modulated carrier signal MTS in a transmission mode of the smart card 1 and to receive a modulated carrier signal MTS in a receiving mode of the smart card 1, said modulated carrier signal MTS containing a data signal DS1 encoded in conformity with an encoding method. A modulated carrier signal MTS received by the transmission and receiving means 5 can be output via a terminal 6 of the transmission and receiving means 5.

A power supply stage 7 of the smart card 1 is connected to the terminal 6 of the transmission and receiving means 5. The power supply stage 7 can receive a received modulated carrier signal MTS. The power supply stage 7 is arranged to generate an operating voltage by rectifying a modulated carrier signal MTS applied thereto. An operating voltage generated by the power supply stage 7 can be applied (in a manner not shown in FIG. 1) to further stages of the smart card 1.

A clock extraction stage 8 of the smart card 1 is also connected to the terminal 6 of the transmission and receiving means 5. The clock extraction stage 8 can be supplied with a received modulated carrier signal MTS. The clock extraction stage 8 is arranged to extract the clock of a received modulated carrier signal TS and to output an extracted carrier signal TS.

The smart card 1 includes demodulation means 9 for demodulating a received modulated carrier signal MTS and for outputting an encoded data signal DS1 contained in the modulated carrier signal MTS. The demodulation means 9 are connected to the terminal 6 of the transmission and receiving means 5 and are arranged to demodulate a received modulated carrier signal MTS by amplitude demodulation. A carrier signal TS extracted by the clock extraction stage 8 can be applied to the demodulation means 9 for this purpose. An encoded data signal DS1 contained in a received modulated carrier signal MTS can be output by the demodulation means 9.

The smart card 1 includes decoding means 10 which are arranged to decode an encoded data signal DS1 output by the demodulation means 9 and to output data D contained in the encoded data signal DS1.

The smart card 1 also includes data processing means 11 which are arranged to process the data output by the decoding means 10. To this end, the data processing means 11 include a microprocessor (not shown in FIG. 1) and storage means (not shown in FIG. 1). The storage means of the data processing means 11 store the previously mentioned balance data of the amount due to the user of the smart card 1. The data processing means 11 can be supplied with the carrier signal TS extracted by the clock extraction stage 8 in order to process data.

The decoding means 10 of the smart card 1 include a first decoding stage 12 and a second decoding stage 13, the first decoding stage 12 being arranged to decode a data signal DS1(RTZ) encoded in conformity with the return-to-zero encoding method whereas the second decoding stage 13 is arranged to decode a data signal DS1(MI) encoded in conformity with the Miller encoding method.

This offers the advantage that the decoding means 10 of the smart card 1 are arranged to decode a received encoded data signal DS1 which has been encoded in conformity with the Return-To-Zero encoding method in the base station 2 or in conformity with the Miller encoding method in a further base station. As a result, the smart card 1 can be used in a plurality of fields of application, for example for access control systems or toll systems, in which the Return-To-Zero code or the Miller code are customarily used or even standardized. It is thus advantageously possible to realize data carriers of the type A and the type B in conformity with an "Approximity Standard" (ISO 14 443) in the smart card 1.

The first decoding stage 12 and the second decoding stage 13 can be supplied with an encoded data signal DS1 which is output by the demodulation means 9 and contains the transmission data ÜD to be transmitted to the smart card 1 by the base station 2. The first decoding stage 12 is arranged to output first data D1 after completion of the decoding operation in the first decoding stage 12. The second decoding stage 13 is arranged to output second data D2 after completion of the decoding operation in the second decoding stage 13.

It is to be noted that there are various factors which could influence the transmission of transmission data ÜD from a base station to the smart card 1; such factors could be the cause that data output by the decoding means 10 of the smart card 1 do not correspond to the transmission data ÜD transmitted by the base station. One such factor occurs when the encoding means of a base station encode transmission data ÜD in conformity with one encoding method and the decoding means 10 of the smart card 1 decode the received encoded data signal DS1 in conformity with a different encoding method. Another factor consists in the superposition of a noise signal on the modulated carrier signal MTS during the transmission in the electromagnetic alternating field; such a noise signal introduces errors in the data output by the decoding means 10 during the demodulation by means of the demodulation means 9 and/or during the decoding by means of the decoding means 10.

The first decoding stage 12 evaluates the redundancy data RD contained in the first data D1 in order to check whether the received first data D1 correspond to the transmission data ÜD transmitted by the base station 2. The evaluation of the redundancy data RD contained in the first data D1 is performed in conformity with the generating of the redundancy data RD in the base station 2. To this end, the first decoding stage 12 calculates the sum of digits of the bit sequence contained in the first data D1 and corresponding to the debit data AD. The result of this calculation is compared with the redundancy data RD contained in the first data D1.

If this comparison yields correspondence, it may be assumed that the first data D1 determined by the first decoding stage 12 correspond to the transmission data ÜD transmitted to the smart card 1 by the base station 2. In this case positive first decision supporting information EUI1 can be output by the first decoding means 12. Decision supporting information EUI supports a decision operation during which it is decided whether the decoding means 10 should output the first data D1 or the second data D2 to the data processing means 11 for further processing.

However, if the described comparison does not reveal correspondence, it must be assumed that the first data D1 determined by the first decoding stage 12 do not correspond to the transmission data ÜD applied to the smart card 1 by the base station 2. In this case the first decoding means 12 output negative first decision supporting information EUI1.

The second decoding stage 13 is capable of delivering second decision supporting information EUI2 which is determined in the same way as the first decision supporting information EUI1, be it that debit data AD and redundancy data RD contained in the second data D2 is then evaluated.

The decoding means 10 of the smart card 11 include a decision stage 14 which is arranged so as to decide which of the decoding stages 12 or 13 is suitable to decode a received encoded data signal DS1. To this end, the first decision supporting information EUI1, determined by the first decoding stage 12, and the second decision supporting information EUI2, determined by the second decoding stage 13, can be applied to the decision stage 14.

The decision stage 14 is arranged to decide, by evaluation of the received decision supporting information EUI1 and EUI2, which of the decoding stages 12 or 13 is suitable to decode the received encoded data signal DS1. The decision stage 14 decides that the first decoding stage 12 is suitable to decode the received encoded data signal DS1 if it receives positive first decision supporting information EUI1. Analogously, the decision stage 14 decides that the second decoding stage 13 is suitable to decode the received encoded data signal DS1 if it receives positive second decision supporting information EUI2. In case positive decision supporting information EUI1 and EUI2 or negative decision supporting information EUI1 and EUI2 is output by the first decoding stage 12 as well as by the second decoding stage 13, the decision stage 14 is arranged to carry out further checks so as to decide which of the decoding stages 12 or 13 is suitable to decode the received encoded data signal DS1. For example, in such a case the smart card 1 can transmit request information to the base station 2; in response thereto the base station 2 transmits the previously transmitted transmission data ÜD again.

The decision stage 14 can apply decision information EI to the data processing means 11, which decision information characterizes the decoding stage 12 or 13 which is suitable to decode the received encoded data signal DS1. The data processing means 11 are arranged to process the first data D1 or the second data D2, depending on the decision information EI applied thereto.

The decoding means 10 of the smart card 1 also include a storage stage 15 in which the first data D1, output by the first decoding stage 12, and the second data D2, output by the second decoding stage 13, can be stored. The data processing means 11 are connected to the storage stage 15 in order to enable the reading out of first data D1 or the second data D2 after the appearance of decision information EI from the decision stage 14.

Including the storage stage 15 in the smart card 1 offers the advantage that data D1 and D2 output by the decoding stages 12 and 13 is first buffered and can be read out from the storage stage 15 by the data processing means 11 after the arrival of decision information EI from the decision stage 14. Thus, data D1 and D2 received and decoded before the arrival of decision information EI will not be lost.

The operation of the smart card 1 upon reception of a modulated carrier signal MTS will be described in detail hereinafter on the basis of a first example. According to this first example, the base station 2 transmits the modulated carrier signal MTS which is shown in FIG. 8 and contains the data signal DS1(RTZ) which has been encoded in conformity with the Return-To-Zero encoding method and contains the bit sequence "10010" of the transmission data ÜD.

The modulated carrier signal MTS is received by the transmission and receiving means 5 so as to be applied to the demodulation means 9. The demodulation means 9 perform amplitude demodulation of the modulated carrier signal MTS shown in FIG. 8.

Figure 9:
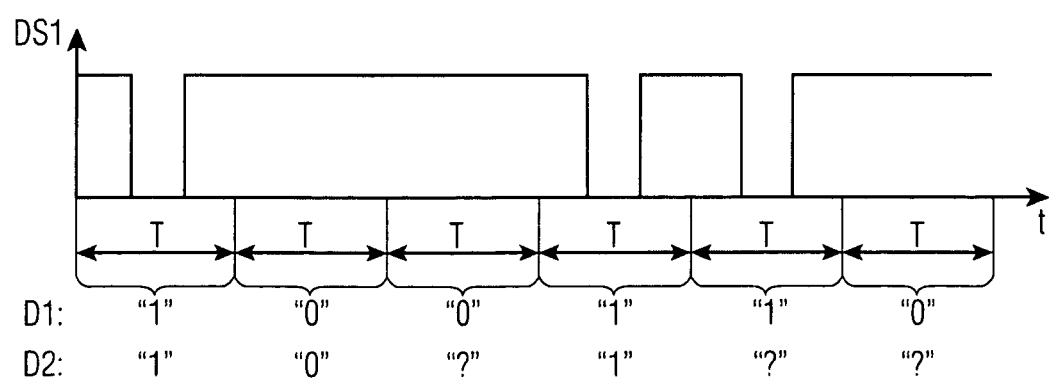
FIG. 9 shows a waveform of the encoded data signal which is contained in the modulated carrier signal shown in FIG. 8 and is applied to the two decoding stages of the smart card, said decoding stages outputting in response thereto first and second data as shown in FIG. 9.

FIG. 9 shows a waveform of the encoded data signal DS1 output by the demodulation means 9. Because at this time the smart card 1 does not have information available as regards the encoding method used to encode the encoded data signal DS1 output by the demodulation means 9, the encoded data signal DS1 is applied to the first decoding stage 12 and to the second decoding stage 13.

In the first decoding stage 12 the encoded data signal DS1 applied thereto is decoded in conformity with the Return-To-Zero method and the bit sequence "100110" shown in FIG. 9 is determined as the first data D1. The first data D1 is applied to the storage stage 15 so as to be stored.

From the first data D1 the first decoding means 12 then determine the bit sequence "1001" which corresponds, on the basis of its position in the bit sequence "100110" of the first data D1, to the bit sequence of the debit data AD. In order to check whether this debit data AD corresponds to the debit data AD transmitted by the base station 2, the first decoding means 12 calculate the sum of the bit sequence "1001" with the value "2". This value "2", being the sum of the debit data AD contained in the first data D1, is then compared with the reference data RD with the bit sequence "10" contained in the first data D1; this reference data also has the value "2". Because the value of the sum of the debit data AD corresponds to the value of the reference data RD of the first data D1, the first decoding stage 12 applies positive first decision supporting information EUI1 to the decision stage 14.

Figure 4:
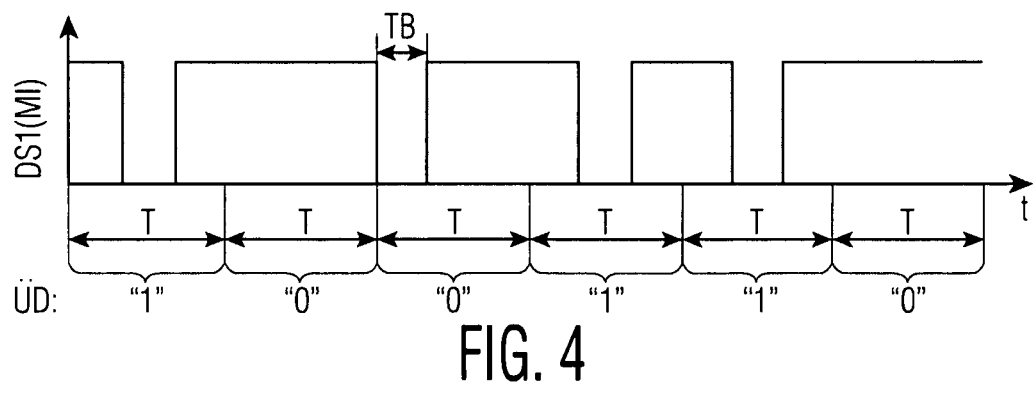
FIG. 4 shows a waveform of a data signal which has been encoded in conformity with the Miller encoding method and may be contained in a modulated carrier signal received by the smart card.

In the second decoding stage 13 the encoded data signal DS1 applied thereto is decoded in conformity with the Miller method. According to the Miller method, in the case of two successive bits "0" in a bit sequence a time interval TB is awaited (as shown in FIG. 4) during which the encoded data signal DS1(MI) has a low amplitude value; therefore, the second decoding stage 13 cannot decode the third bit, so that a "?" is inserted in the bit sequence "10?110" of the second data D2 shown in FIG. 9. The second data D2 shown applied to the storage stage 15 so as to be stored.

From the second data D2 the second decoding means 12 then determine the bit sequence "10?1" which corresponds, on the basis of its position in the bit sequence "10?110" of the second data D2, to the bit sequence of the debit data AD. Because one bit of the debit data AD could not be reliably decoded, the second decoding means 13 output negative second decision supporting information EUI2 to the decision stage 14.

On the basis of the received positive first decision supporting information EUI1 and the negative second decision supporting information EUI2, the decision stage 14 then applies decision information EI which characterizes the first decoding stage 12 to the data processing means 11.

In response thereto the data processing means 11 read out the first data D1 stored in the storage stage 15 and determine the debit data AD contained in the first data D1 with the bit sequence "100" corresponding to the value "9". The data processing means 11 then subtract the value "9" of the debit data AD from the balance data stored in the data processing means 11 and store the calculated value as balance data again in the data processing means 11, so that the fare amounting to "9" euros has been debited to the account balance of the user of the smart card 1.

This offers the advantage that transmission data ÜD encoded by the base station 2 in conformity with the Return-To-Zero method as well as transmission data ÜD encoded in conformity with the Miller method by a further base station can be decoded by the decoding means 10 of the smart card 1 and hence can be processed by the smart card 1. Therefore, the smart card 1 can be used for a variety of fields of application.

The operation of the smart card 1 upon reception of a modulated carrier signal MTS will now be described in detail on the basis of a second example. The smart card 1 is also arranged to receive a modulated carrier signal MTS containing an encoded data signal DS1 which includes decoding stage instruction information BI. Decoding stage instruction information BI may in such case be formed by a special bit sequence, for example "1111", of the debit data AD. This debit data AD, having the bit sequence "1111", can be transmitted to the smart card 1 by the base station 2 in conformity with the previously described first example, and is ultimately read out from the storage stage 15 by the data processing means 11 for the further processing of the debit data AD.

The data processing means 11 are arranged to output, in response to the appearance of the bit sequence "1111" as the debit data AD, decoding stage instruction information BI to the decision stage 14. The decision stage 14 is arranged to decide, by evaluation of the decoding stage instruction information BI applied thereto, which of the decoding stages 12 or 13 is intended to decode a next encoded data signal DS1 that can be received. The decision stage 14 can supply the data processing means 11 with appropriate decision information EI.

This offers the advantage that the base station 2 can supply the smart card 1 with decoding stage instruction information BI which is contained in the modulated carrier signal MTS and is capable of characterizing the decoding stage 12 or 13 intended to decode an encoded data signal DS1 transmitted in the modulated carrier signal MTS by the base station 2 after the transmission of the decoding stage instruction information BI. The base station 2 can thus select for the smart card 1 the decoding stage 12 or 13 of the smart card 1 which will be suitable for decoding the encoded data signal DS1.

The smart card 1 includes encoding means 16 for supplying an encoded data signal DS2, which encoding means include a first encoding stage 17 and a second encoding stage 18. In the transmission mode of the smart card 1, the data processing means 11 can supply the base station with third data D3 to be transmitted, i.e. to the first encoding stage 17 or to the second encoding stage 18. The first encoding stage 17 is arranged to encode third data D3 applied thereto in conformity with the frequency keying encoding method and to output an encoded data signal DS2. The second encoding stage 18 is arranged to encode third data D3 applied thereto in conformity with the phase keying encoding method and to output an encoded data signal DS2 which contains the third data D3.

The smart card 1 also includes modulation means 19 which are arranged to modulate the encoded data signal DS2 output by the encoding means 16 and to output a modulated carrier signal MTS. The modulation means 19 are arranged to modulate the encoded data signal DS2 applied thereto by way of load modulation as has since long been known.

A modulated carrier signal MTS output by the modulation means 19 can be applied to the terminal 6 of the transmission and receiving means 5 of the smart card 1 and transmitted to the base station 2 or to a further base station which is not shown in FIG. 1.

This offers the advantage that the smart card 1 is also suitable for transmitting an encoded data signal DS2 which is contained in a modulated carrier signal MTS and contains third data D3 which has been encoded in conformity with the frequency keying method or the phase keying method. As a result, the smart card 1 can be used in a plurality of fields of application in which communication with a base station is possible while utilizing only one of the said codes.

Figure 10:
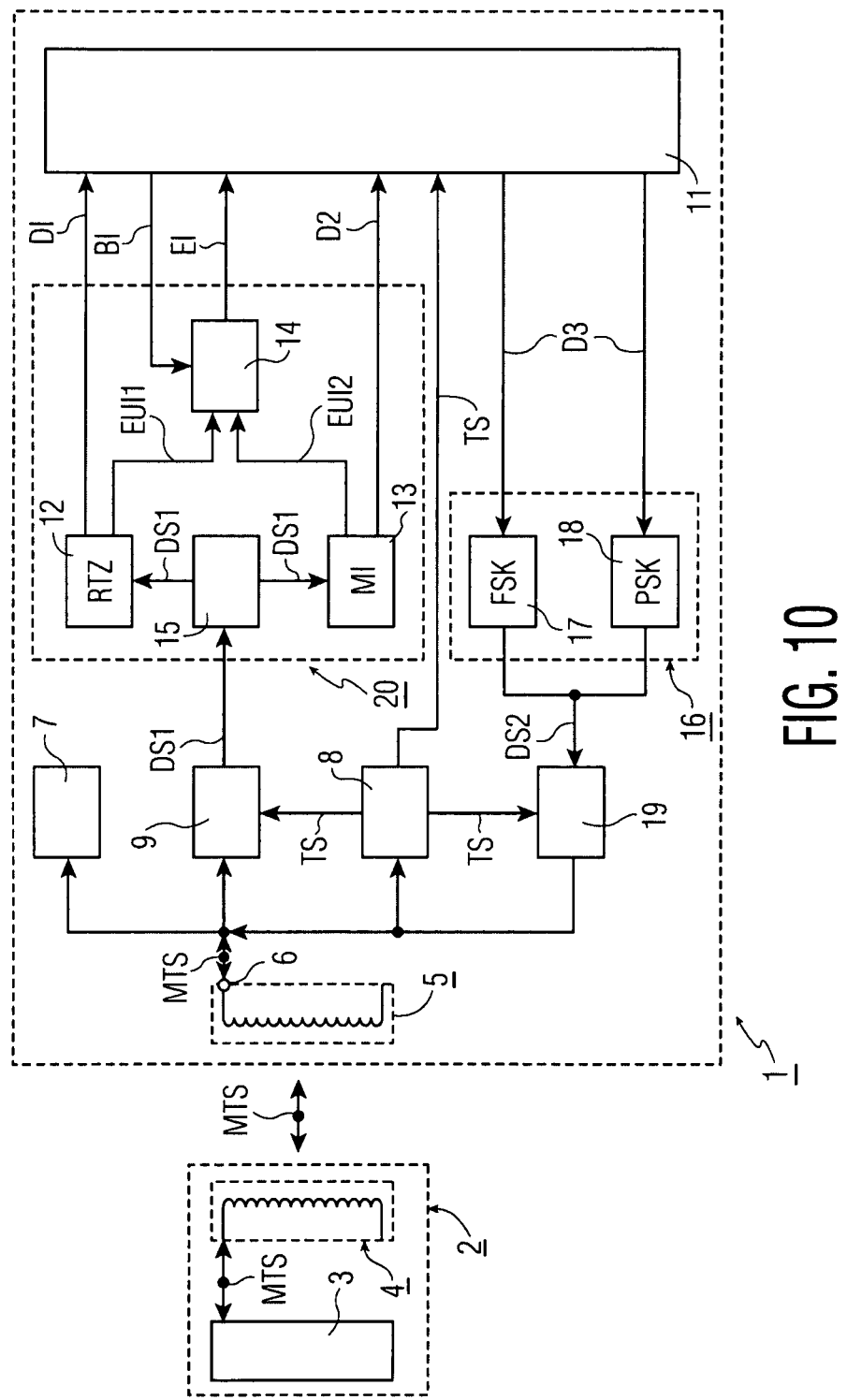
FIG. 10 shows a block diagram of a second embodiment of a smart card according to the invention which is arranged for the contactless exchange of data with a base station, an encoded data signal received by the smart card in a modulated carrier signal being buffered in a storage stage prior to decoding by means of the two decoding stages.

FIG. 10 shows a block diagram of a base station 2 and a smart card 1 which constitutes a second embodiment of a data carrier according to the invention. The second embodiment of the smart card 1 according to the invention corresponds to the first embodiment of the smart card 1 according to the invention; stages of decoding means 20 of the second embodiment correspond to stages of the decoding means 10 of the first embodiment. The decoding means 20, however, include a storage stage 15 in which a received encoded data signal DS1 can be stored prior to the decoding by the first decoding stage 12 and the second decoding stage 13.

This offers the advantage that data received by the smart card 1 before a decision has been taken as to which decoding stage 12 or 13 is suitable for decoding a received encoded data signal DS1 will not be lost.

It is to be noted that a data carrier according to the invention need not necessarily be provided with storage means for storing a received encoded data signal or for storing data output by the decoding stages. However, it has been found that it is advantageous when in such a data carrier data D1 output by the first decoding stage are applied to the data processing means for further processing before the decision stage can decide which of the decoding stages is suitable for decoding a received encoded data signal DS1.

When the first decoding stage is then arranged to decode an encoded data signal in conformity with a method customarily used for the encoding of transmission data ÜD by a base station, data of an encoded data signal DS1 received prior to the arrival of decision information EI from the decision stage are usually already correctly decoded; this constitutes a major advantage.

It is to be noted that decoding means of a data carrier according to the invention may also include three, five, ten or even more decoding stages, each of which decodes a received encoded data signal in conformity with a respective different method. This offers the advantage that data signals encoded in conformity with a plurality of different codes can be decoded in the data carrier and that the data contained in the encoded data signals can be processed.

Furthermore, it is to be noted that encoding means of a data carrier according to the invention may also include three, five, ten or even more encoding stages for encoding third data to be transmitted to a base station in conformity with a plurality of different encoding methods. The respective coding stage used can then be defined by the data processing means of the data carrier according to the invention but also by the base station, communicating with the data carrier, by transmission of encoding stage instruction information.

It is to be noted that demodulation means of a data carrier according to the invention may also include several demodulation stages which are arranged to demodulate modulated carrier signals which have been modulated by amplitude modulation with different modulation depths. This offers the advantage that amplitude modulated carrier signals with modulation depths of, for example, 10%, 20%, 50% or 70% can also be demodulated.

It is also to be noted that a decoding stage can output negative decision supporting information EUI, for example, also if the error rate of the data determined in the decoding stage exceeds a given error rate threshold.

It is also to be noted that the inclusion of at least two decoding stages is also advantageous in a data carrier which is arranged to demodulate a received modulated carrier signal which has been modulated by frequency modulation or phase modulation.

Figure 7:
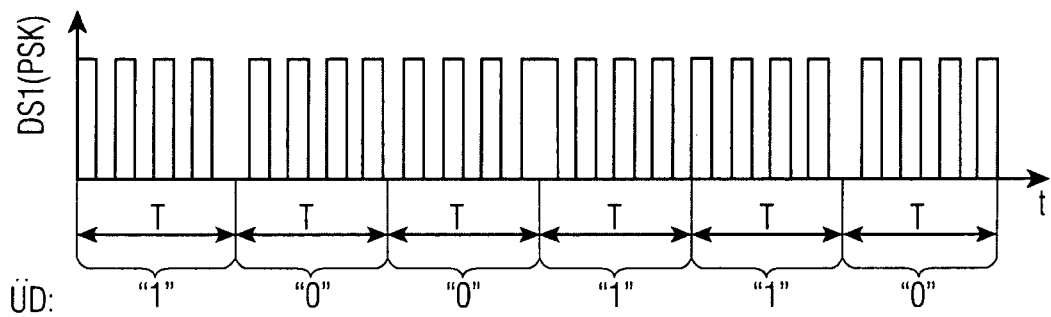
FIG. 7 shows a waveform of a data signal which has been encoded in conformity with a phase keying encoding method and may be contained in a modulated carrier signal received by the smart card.

Finally, it is to be noted that if a data signal DS1(PSK), as is shown in FIG. 7, encoded in conformity with the phase keying code, would be decoded by a decoding stage which decodes encoded data signals DS1 in conformity with the frequency keying code, the output for all bits of the transmission data were bits "1" or bits "0". For this case the decision stage is arranged to decide, by checking the reference data contained in the transmission data, which of the decoding stages is suitable for decoding the encoded data signal.

The invention claimed is:

1. A data carrier device comprising:
   receiving means for receiving a modulated carrier signal which contains an encoded data signal encoded in conformity with an encoding method, and
   said encoded data signal including decoding instruction information;
   a demodulation means for demodulating the received modulated carrier signal and for outputting the encoded data signal contained therein,
   decoding means for decoding the encoded data signal and for outputting data, and
   data processing means for processing the data output by the decoding means,
   characterized in that
   the decoding means including at least a first physical decoding stage and a second physical decoding stage, the first decoding stage being arranged to decode said data signal encoded in conformity with a first decoding method whereas the second decoding stage is arranged to decode a data signal encoded in conformity with a second decoding method and
   wherein said first decoding method is Manchester and the second decoding method is Miller; and
   wherein said decoding means further includes a decision stage capable of determining which of the first and second stages decodes the encoded data signal.

2. The data carrier device as claimed in claim 1, wherein the decoding stage instruction information includes redundancy data.

3. The data carrier device as claimed in claim 1, wherein the decoding means includes a storage stage in which the encoded data signal can be stored prior to being read out by the data processing means.

4. The data carrier device as claimed in claim 1, further comprising an encoding means for outputting an encoded data signal, said encoding means including at least a first encoding stage and a second encoding stage.

5. The data carrier device as claimed in claim 4, wherein said first encoding stage is designed to encode data in conformity with a third method and said second encoding stage is designed to encode data in conformity with a fourth method which is different from said third method.

6. The data carrier device as claimed in claim 1, further comprising modulation means designed to modulate the encoded data signal output.

7. A data carrier device comprising:
   a receiver designed to receive a modulated carrier signal which includes an encoded data signal;
   a demodulator capable of receiving the modulated carrier signal and designed to output the encoded data signal included therein;
   a decoder designed to decode the encoded data signal and to output data;
   a data processor designed to process the output data from the decoder; and
   wherein the decoder includes a first decoding stage and a second decoding stage, the first decoding stage designed to decode the encoded data signal which is encoded in conformity with a first encoding method and the second decoding stage designed to decode the encoded data signal encoded in conformity with a second encoding method, wherein said first encoding method is Return-To-Zero (RTZ) and second encoding method is Miller and wherein both the first decoding stage and the second decoding stage attempt to decode the encoded data signal.

8. The data carrier device of claim 7, wherein the data is output to the data processor before a decision stage determines which of the first and second decoding stages is suitable for decoding the encoded data signal.

9. A data carrier device as claimed in claim 7, wherein said encoded data signal has a structure that ensures that time intervals with high amplitude value of the modulated carrier signal are substantially at least as long as time intervals with low amplitude value of the modulated carrier signal.

10. A data carrier device comprising:
    a receiving means for receiving a modulated carrier signal which contains an encoded data signal,
    a demodulation means for demodulating the received modulated carrier signal and for outputting the encoded data signal contained therein,
    a decoding means for decoding the encoded data signal and for outputting data, a data processing means for processing the data output by the decoding means, I
    the decoding means including at least a first decoding stage and a second decoding stage, the first decoding stage being arranged to decode said data signal in conformity with a first decoding method while simultaneously the second decoding stage is arranged to decode said data signal in conformity with a second decoding method, wherein said first decoding method is Manchester and said second decoding method is Miller; and
    a decision stage which is arranged to decide which of the first and second decoding stages decodes said data signal.

11. A data carrier device comprising:
    a receiving device capable of receiving a modulated carrier signal which contains an encoded data signal, a demodulation device configured to demodulate the received modulated carrier signal and outputs the encoded data signal contained therein, a decoding device capable of decoding the encoded data signal and outputting data, said decoding device including at least a first decoding stage and a second decoding stage, the first decoding stage is arranged to decode said data signal in conformity with a first decoding method whereas the second decoding stage is arranged to decode said data signal in conformity with a second decoding method, a decision stage which determines which of the first and second decoding stages is suitable to decode the encoded data signal, a data processing device configured to process the data output by the decoding device, wherein once the decision stage applies decision information to the data processing device regarding which of the first and second decoding stages decodes the encoded data signal, the determined first or second decoding stage is used for processing the remainder of the encoded data signal, and wherein the first decoding method is Manchester and the second decoding method is Miller.

* * * * *